United States Patent
Snow

(10) Patent No.: US 7,029,749 B2
(45) Date of Patent: Apr. 18, 2006

(54) MOLDABLE ARTICLE, METHOD OF MAKING AND COMPOSITION FOR MAKING MOLDABLE ARTICLES

(76) Inventor: Rebecca Snow, 220 Donald J. Lynch Blvd., Marlborough, MA (US) 01752

(*) Notice: Subject to any disclaimer, the term of this patent is extended or adjusted under 35 U.S.C. 154(b) by 0 days.

(21) Appl. No.: 10/791,877

(22) Filed: Mar. 4, 2004

(65) Prior Publication Data

US 2004/0166352 A1   Aug. 26, 2004

Related U.S. Application Data

(63) Continuation of application No. 09/838,345, filed on Apr. 20, 2001, now Pat. No. 6,703,142.

(60) Provisional application No. 60/208,882, filed on Jun. 2, 2000, now abandoned.

(51) Int. Cl.
*B32B 3/26* (2006.01)
*B32B 27/30* (2006.01)

(52) U.S. Cl. .............. 428/304.4; 428/319.3; 428/319.7; 428/520; 428/522; 428/922

(58) Field of Classification Search ............ 428/304.4, 428/319.3, 319.7, 520, 522, 922; 2/411, 2/412, 414, 425
See application file for complete search history.

(56) References Cited

U.S. PATENT DOCUMENTS

| | | | |
|---|---|---|---|
| 2,206,029 A | 7/1940 | Daniels | |
| 3,391,595 A | 7/1968 | Iwai | |
| 3,641,688 A | 2/1972 | von den Benken | 36/43 |
| 3,895,405 A | 7/1975 | Edwards | 12/146 M |
| 3,902,940 A | 9/1975 | Heller, Jr. et al. | 156/79 |
| 4,219,361 A | 8/1980 | Sutton et al. | 106/63 |
| 4,237,626 A | 12/1980 | Brown | 36/43 |
| 4,272,898 A | 6/1981 | Tansill | 36/44 |
| 4,413,429 A | 11/1983 | Power | 36/44 |
| 4,433,494 A | 2/1984 | Courvoisier et al. | 36/119 |
| 4,669,142 A | 6/1987 | Meyer | 12/142 N |
| 4,728,566 A | 3/1988 | Lancaster et al. | 428/286 |
| 4,800,115 A | 1/1989 | Havens | 428/178 |
| 4,848,566 A * | 7/1989 | Havens et al. | 206/719 |
| 4,955,909 A | 9/1990 | Ersek et al. | 623/11 |
| 4,962,593 A | 10/1990 | Brown | 36/44 |

(Continued)

FOREIGN PATENT DOCUMENTS

DE    3437-786 A    4/1986

(Continued)

OTHER PUBLICATIONS

Collier, J. "A Moist, Odour-Free Environment: A Multicentred Trial of a Foamed Gel and Hydrocolloid Dressing," 7 Professional Nurse 804, 806 and 808 (Sep. 1992).

(Continued)

*Primary Examiner*—D. S. Nakarani
(74) *Attorney, Agent, or Firm*—Sterne, Kessler, Goldstein & Fox, P.L.L.C.

(57) ABSTRACT

A moldable article that can be custom-fitted to a particular user. Such an article comprises a thermoplastic material such as ethylene vinyl acetate modified by an antistatic agent selected from the group consisting of polyol amines such as ethoxylated amines, ethoxylated fatty alcohols, phosphoric acid esters, quaternary ammonium salts, and amphoteric compounds such as betaine. The article is heated until the thermoplastic material softens, then pressed against a user's body part. The article is allowed to cool, resulting in a custom-fitted article. Such articles may be repeatedly re-heated and re-molded and may include, e.g., moldable footbeds, racquet handles, shin guards, helmets, and seats.

10 Claims, 3 Drawing Sheets

U.S. PATENT DOCUMENTS

| | | | |
|---|---|---|---|
| 4,969,968 A | 11/1990 | Leatherman | 156/272.4 |
| 5,021,293 A | 6/1991 | Huang et al. | 428/328 |
| 5,035,713 A | 7/1991 | Friis | 623/16 |
| 5,041,319 A * | 8/1991 | Becker et al. | 428/71 |
| 5,089,556 A | 2/1992 | Tabor et al. | 525/64 |
| 5,095,570 A | 3/1992 | Bar et al. | 12/142 N |
| 5,096,761 A | 3/1992 | Roberts et al. | 428/77 |
| 5,123,180 A | 6/1992 | Nannig et al. | 36/43 |
| 5,254,197 A | 10/1993 | Klems | 156/272.2 |
| 5,294,763 A | 3/1994 | Chamberlain et al. | 219/729 |
| 5,326,354 A | 7/1994 | Kwarteng | 623/66 |
| 5,555,584 A | 9/1996 | Moore, III et al. | 12/142 N |
| 5,658,330 A | 8/1997 | Carlisle et al. | 623/11 |
| 5,667,621 A | 9/1997 | Dougherty et al. | 156/275.7 |
| 5,698,306 A | 12/1997 | Prosise et al. | 428/312.8 |
| 5,733,647 A | 3/1998 | Moore, III et al. | 428/304.4 |
| 5,762,854 A | 6/1998 | Valyi | 264/255 |
| 5,829,171 A | 11/1998 | Weber et al. | 36/93 |
| 5,855,818 A | 1/1999 | Gan et al. | 252/511 |
| 6,090,479 A * | 7/2000 | Shirato et al. | 428/304.4 |

FOREIGN PATENT DOCUMENTS

| | | |
|---|---|---|
| WO | WO 85/03624 | 8/1985 |

OTHER PUBLICATIONS

Mennen, U., "A Simple, Comfortable, Conforming, and Adaptable Splint," 14 The Journal of Hand Surgery 576-78 (May 1989).

Fish, F.S., et al., "Aquaplast Thermoplastic (Opti-Mold)," 20 J. Dermatol. Surg. Oncol. 239-44 (Apr. 1994).

Steinberg, G., et al., "Dry Gangrene of Toes: Managed with Foam Rubber Boots and Ambulation," 76 N.Y. State J. Med. 907-11 (Jun. 1976).

Schmidtmadel, W., "The Treatment of Decubitus Ulcers with Polyester Foam-Rubber," 12 Germ. Med. Mon. 539-40 (Nov. 1967).

* cited by examiner

MOLDABLE ARTICLE, METHOD OF MAKING AND COMPOSITION FOR MAKING MOLDABLE ARTICLES

BACKGROUND OF THE INVENTION

1. Field of the Invention

The present invention relates generally to moldable articles and compositions for making the same. In particular, the invention relates to articles that are heat-moldable.

2. Background Art

It is becoming more and more desirable to provide wearers with customized articles for sporting goods and the like. Such articles provide the wearer with a greater degree of comfort and support. One way this customization can be achieved is by producing articles that simulate the contours of a particular part of the body on which they are worn or used. Examples include footbeds that simulate the bottom contours of the human foot, racquet handles that simulate the contours of the hand, helmets that simulate the contours of the head, and shin pieces that simulate the contours of the lower leg.

A number of approaches have been developed to provide customized articles. In one approach, the article includes a layer of thermoplastic material which will soften when heated. The wearer then presses a body part against the heated article, creating an impression. The thermoplastic material is then allowed to cool while retaining the impression of the wearer's body part. An example of this approach is disclosed in U.S. Pat. No. 5,733,647. In this example, the thermoplastic material comprises a mixture of ethylene copolymers and/or ethylene terpolymers with an ethylene terpolymer such as ethylene vinyl acetate modified by the addition of carbonyl groups incorporated as part of the main chain. While the thermoplastic material disclosed in U.S. Pat. No. 5,733,647 can be heated and molded, it is a non-foam material which reduces the comfort provided by the article and microwave heating a thermoplastic material that includes carbonyl groups in the main chain can result in the emission of toxic carbon monoxide fumes. Obviously, this is dangerous for consumers who may choose to mold the article at home.

Thus, the need exists for an article which can be custom molded in a simple and efficient manner, without the possibility of emitting toxic fumes.

BRIEF SUMMARY OF THE INVENTION

The present invention solves the above stated problems by providing an article that is efficiently heat-molded without releasing carbon monoxide and which can be re-heated and re-molded. In particular, the article comprises a layer of modified ethylene vinyl acetate. Preferred modifying agents include polyol amines such as ethoxylated amines, ethoxylated fatty alcohols, phosphoric acid esters, quaternary ammonium salts, and amphoteric compounds such as betaine. An article made from this composition can be heat-molded quickly and efficiently. The moldable article may be heated using microwave heating or other known heating methods. During heating, the article does not release carbon monoxide. Once heat-softened, an impression is formed in the article using, e.g., a body part, such as a head, foot, or lower leg. After the impression is created in the softened article such that it conforms to the contours of the body part, the article is allowed to cool, resulting in a custom-fitted article. If the user is unhappy with the impression or uncomfortable with the fit, the process can be repeated by re-heating the article and re-creating the impression.

BRIEF DESCRIPTION OF THE FIGURES

The foregoing and other features and advantages of the present invention will be apparent from the following, more particular description of a preferred embodiment of the invention, as illustrated in the accompanying drawings.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
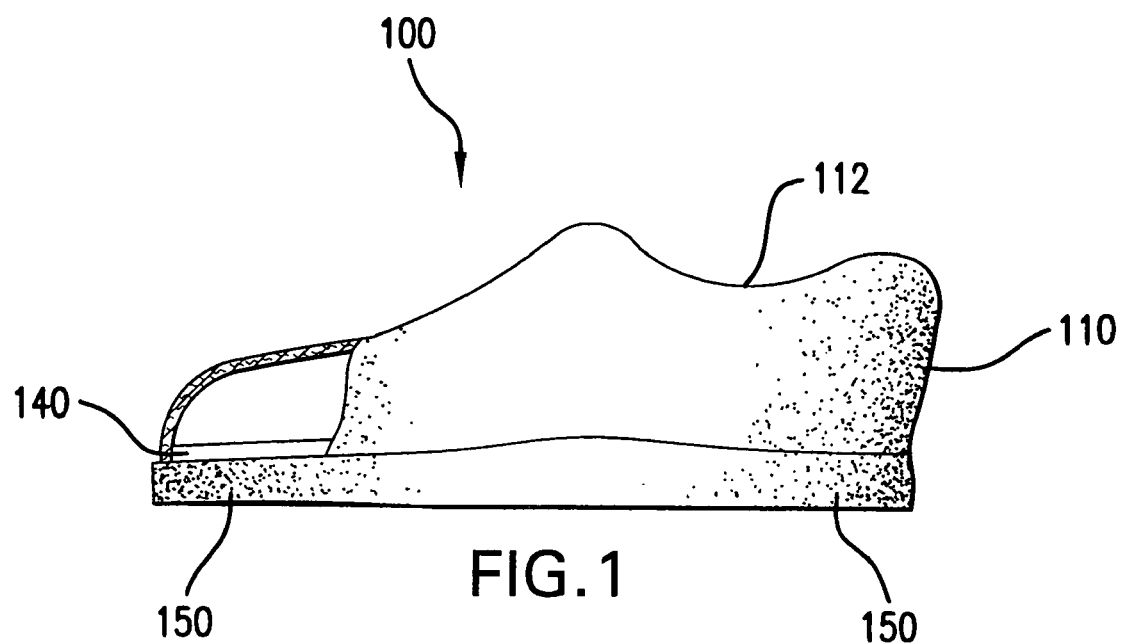
FIG. 1 is a side view of a shoe incorporating a moldable footbed of the present invention with part of the toe portion of the shoe cut away showing part of the toe portion of the shoe in cross section.

FIG. 1 shows a side view of a shoe 100 having an upper 110, a flexible sole 150, and a moldable footbed 140. As the term is used herein, footbed includes sockliners, insoles, and innersoles, as those terms are generally known to one skilled in the relevant art. Upper 110 may be made of any conventional flexible material, such as leather, canvas, mesh, or other similar material, as would be apparent to one skilled in the relevant art. Upper 110 has an ankle opening 112 designed to receive a foot.

Moldable footbed 140 is preferably made of a foam thermoplastic material, preferably composed of modified ethylene vinyl acetate (EVA) as described below. Moldable footbed 140 may be connected to upper 110 and sole 150 by a fastening means, such as glue, cement, adhesive, stitching, or other means of attachment, as would be apparent to one skilled in the relevant art. However, moldable footbed 140 need not be connected to the upper 110 or sole 150 at all. Instead, moldable footbed 140 may be inserted into ankle opening 112 and simply lay on top of a sole. In alternate embodiments, moldable footbed 140 may only cover the back portion of the foot, the front portion of the foot, or any selected areas of the foot, rather than the whole foot, as would be apparent to one skilled in the relevant art.

Flexible sole 150 may be made of any conventional durable resilient material such as rubber or other similar material as would be apparent to one skilled in the relevant art. Sole 150, as shown in FIG. 1, is coupled to moldable footbed 140 and upper 110 by a fastening means, such as glue, cement, adhesive, stitching, or any other means of attachment as would be apparent to one skilled in the relevant art.

Figure 2:
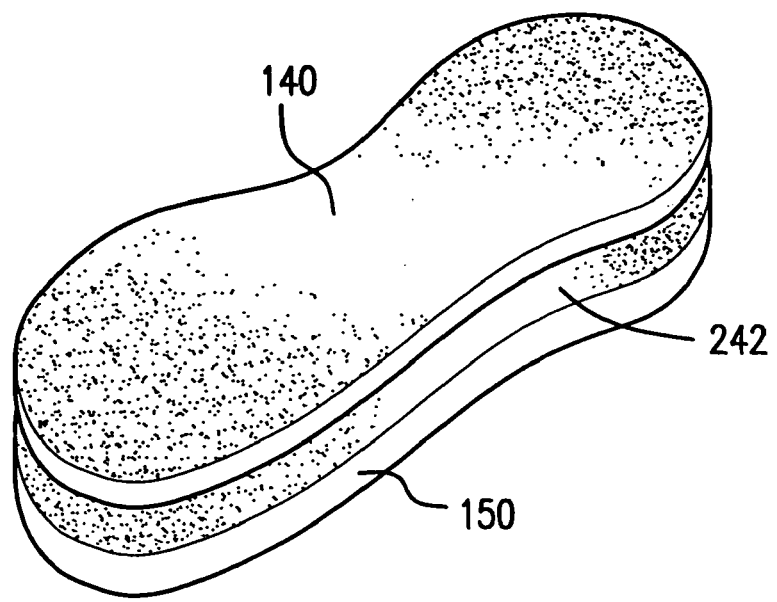
FIG. 2 is a perspective view of the moldable footbed of FIG. 1.

In an alternate embodiment, a cushioning layer 242 may be provided above or below moldable footbed 140, or both, but preferably, such cushioning layer 242 would be provided below moldable footbed 140 as part of sole 150, as shown in FIG. 2. Cushioning layer 242 may be a flexible foam such as polyethylene foam, and may be used to provide additional insulation and cushioning. For example, moldable footbed 140 may be relatively thin to provide the wearer with the customized fit. Cushioning layer 242 provided below moldable footbed 140 may be a conventional midsole type material to provide additional cushioning, and may be laminated.

In a preferred embodiment, moldable footbed 140 is made of a thermoplastic material, comprised of a modified polymer. Preferably, moldable footbed 140 is approximately flat, to allow consistent, predictable, and even heating. Moldable footbed 140 may be any thickness suitable for use in footwear, preferably between 1 millimeter and 5 centimeters, and more preferably between 3 and 8 millimeters.

In a preferred embodiment, the polymer comprises ethyl vinyl acetate (EVA) or rubberized EVA modified with an antistatic (electrostatic dissipating) agent, preferably a polyol amine, such as ethoxylated amines, and preferably NOROPLAST 2000 series, NOROPLAST 8000 series, or NOROPLAST 832 available from Elf-Atochem of France. Ethoxylated fatty alcohols, phosphoric acid esters, quaternary ammonium salts, and amphoteric compounds such as betaine may also be used. Other materials may also be used such as ZELEC® ECP made by E.I. duPont de Nemours and Company of Wilmington Del. Different ZELEC® DCP products consist of an antimony-doped tin oxide outer shell with either a hollow silica core, a mica core, a titanium dioxide core, or no core particle. Another DUPONT product which may be used in combination with EVA is AVITEX®, which is a sodium salt of sulfated oleyl actates. Other similar materials utilizing the desirable properties of the above materials may also be used with the polymer, as would be apparent to one of ordinary skill in the relevant art.

In a preferred embodiment, the modifying agent is an amine derivative of the formula $R^1N(R^2)_2$, wherein $R^1$ is a hydrophobic alkyl group and $R^2$ is an alkyl group substituted by at least one hydrophobic moiety selected from OH, $CO_2H$, $CO_2R^3$, where $R^3$ is an alkyl; and the like. Preferred groups of $R^2$ include hydroxyalkyl groups. Most preferably, $R^2$ is hydroxyethyl. As used herein, the term "hydrophobic alkyl group" refers to a naturally occurring lipid per se, a hydrophobic branched or unbranched hydrocarbon comprising approximately 4 to approximately 26 carbon atoms, preferably approximately 5 to approximately 19 carbon atoms, or a fatty acid or ester thereof. Suitable hydrophobic alkyl groups include, but are not limited to, long chain alkonoyl groups such as palmityl ($C_{15}H_{31}$), oleyl ($C_{15}H_{29}$), steoryl ($C_{17}H_{35}$), lauryl ($C_{11}H_{23}$), cholyl, and myristyl ($C_{13}H_{27}$).

In a most preferred embodiment, the modifying agent is NOROPLAST 2002, a polyol amine derivative available from Elf-Atochem. It has a reported total alkalinity of between 3.25–3.60 ml HCL(n)/g. The total alkalinity (1+2) is preferably 2% or lower. At 25° Celsius, it is a homogeneous liquid with a specific gravity between 0.890–0.925, and a viscosity of approximately 122 mPa. Preferably, it has a pour point of 8° C. or less, is 0.5% or less water, and has no flashpoint up to 100° C.

Preferably, the thermoplastic material of moldable footbed 140 is comprised of approximately 30% or less modifying agent in liquid phase. In a more preferred embodiment, the thermoplastic material of moldable footbed 140 is comprised of between approximately 10% and approximately 30% modifying agent in liquid phase. In a most preferred embodiment, the thermoplastic material of moldable footbed 140 is comprised of approximately 70% EVA and approximately 30% modifying agent in liquid phase. It is preferable to minimize the mass of the non-thermoplastic material in moldable footbed 140 so that the thermoplastic material may be heated more quickly. Longer heat times are undesirable because they may lead to the emission of toxic fumes. In an alternate embodiment, the thermoplastic material of moldable footbed 140 may also comprise a cement, such as n-heptane, acetone, or cyclohexanone, as would be apparent to one skilled in the relevant art.

The thermoplastic material of moldable footbed 140 may be formed by the following steps:
1. Mixing the EVA with the modifying agent;
2. Rolling the mixture;
3. Sheet processing the mixture;
4. Heating the mixture;
5. Cooling the mixture; and
6. Splitting the mixture.

In the embodiment shown in FIG. 2, moldable footbed 140 may be removable from shoe 100. In this way, moldable footbed 140 may be custom-fitted to the foot of a wearer by heating it to a preselected softening point, to soften the thermoplastic material. In one embodiment, moldable footbed 140 is heated by placing it in a conventional microwave oven until moldable footbed 140 is soft and compliant. Preferably, a pair of moldable footbeds 140 are heated in a conventional microwave oven (700–1000 watts). In a preferred embodiment, moldable footbeds 140 are heated in a 1000 watt microwave oven on high power for approximately three minutes. It is known that there are significant variations in the heating abilities of microwave ovens. Thus, various other size microwave ovens, heating times and heating methods could be used, as would be apparent to one skilled in the relevant art. In a less preferred embodiment, moldable footbed 140 may be heated by placing it in a conventional oven for a suitable time to soften the thermoplastic material. Alternatively, moldable footbed 140 may be heated using any heating means, for example, by placing it in a water-tight container in boiling water for a suitable time.

Figure 3:
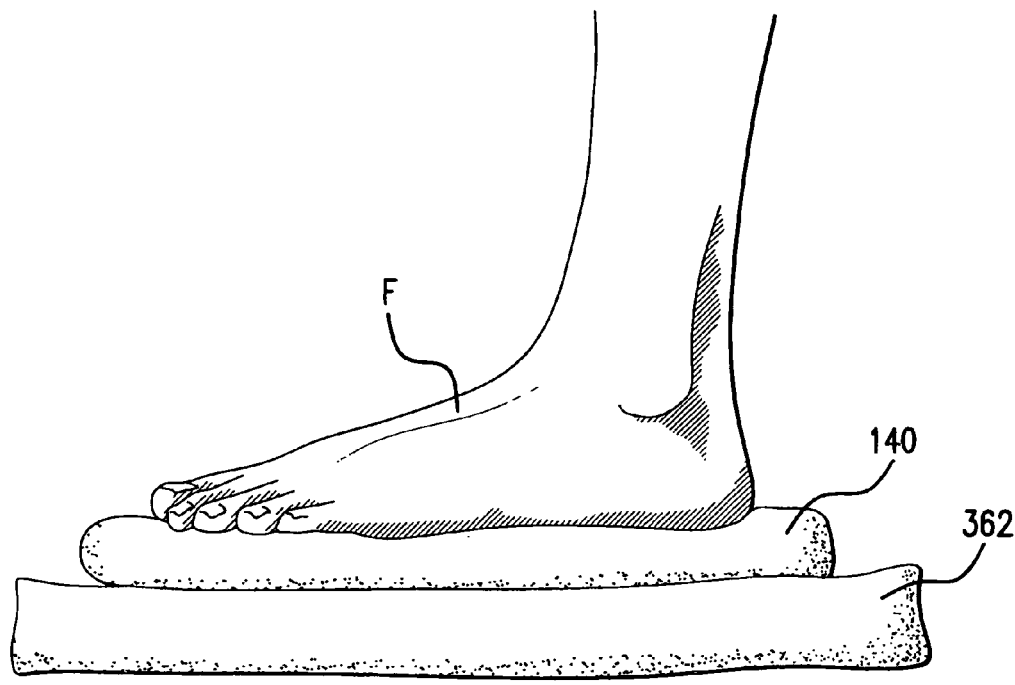
FIG. 3 is a side view showing the process of molding the footbed of FIG. 1.

After moldable footbed 140 is softened through a heating process, the user may then mold footbed 140 to the contours of the wearer's foot to create a custom fit. In a preferred embodiment, as shown in FIG. 3, a wearer may place moldable footbed 140 on a cushion 362, such as a conventional bed pillow, stack of towels, or other suitable object, and press foot F against moldable footbed 140, allowing moldable footbed 140 to form to the contours of foot F. Foot F may continue to press against moldable footbed 140 until moldable footbed 140 substantially cools, resulting in a custom-fitted article. If the fit is not correct, moldable footbed 140 may be reheated, resoftened, and remolded to reform moldable footbed 140 to the contours of foot F.

In a preferred embodiment, both moldable footbeds 140 of a pair of shoes may be heated together in a microwave oven. Preferably moldable footbeds 140 may be heated on a non-energy absorbing, rotating microwave tray. Using a microwave oven without a rotating microwave tray may lead to uneven heating. A preferable rotating microwave tray is one that absorbs energy and uses the conduction of heat to soften footbed 140, such as one made of glass. In an alternate embodiment, a polypropylene microwave tray could be used. Non-energy absorbing rotating trays leave more energy available to heat footbed 140. In an alternate embodiment, a microwave tray may be used that includes an outline of one or two insoles. Such an embodiment would facilitate consistent placement of moldable footbeds 140, which is important for consistent, predictable, and even heating. Moldable footbeds 140 may also be turned or inverted during the heating process. Preferably, footbeds 140 are heated right side up without being inverted or turned during the heating process. Alternatively, footbeds 140 may be heated upside down so that the top portion of moldable footbeds 140 are softened more than the bottom portion of footbeds 140. This allows the top portion of moldable footbeds 140 to easily form to the contour of a wearer's foot, while allowing the bottom portion of footbeds 140 to remain stiffer, thus reducing the chance of folding or buckling when being placed in the shoe.

Figure 4:
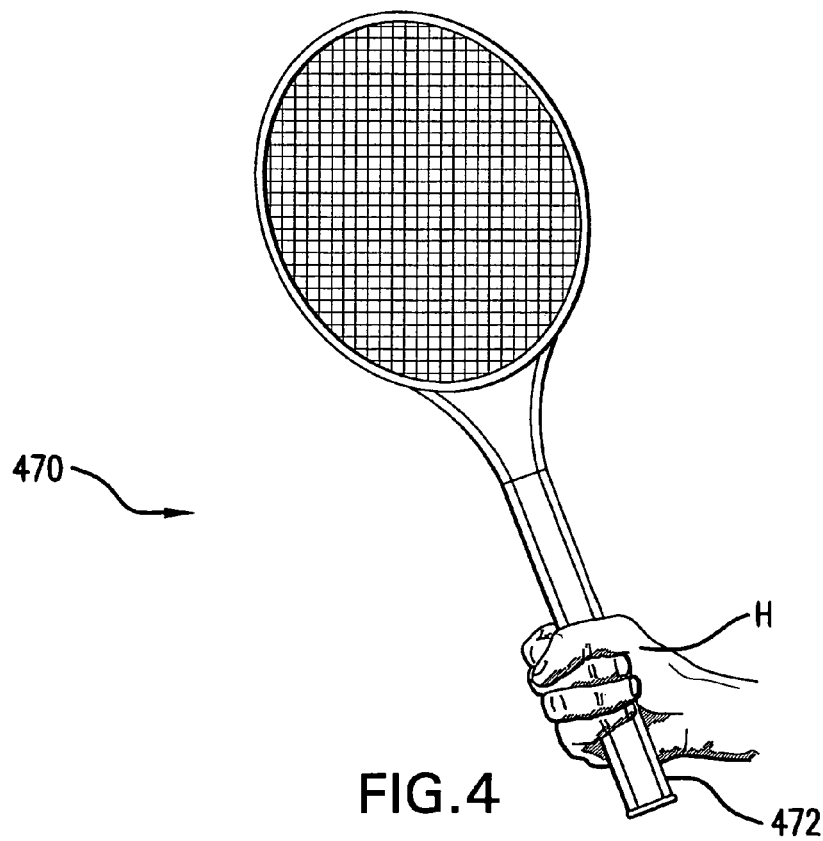
FIG. 4 is a perspective view of a moldable racket handle being conformed to a user's hand.

The thermoplastic material of the present invention may be used to make moldable articles other than footbeds. As shown in FIG. 4, a moldable handle 472 of a racquet 470 may be composed of the same thermoplastic material described above. Racquet handle 472 may heated and softened in substantially the same way as described above. A wearer may then place his hand H around racquet handle 472, forming an impression. The wearer may keep hand H around racquet handle 472 until it cools, resulting in a custom-fitted racquet handle. In alternate embodiments, a moldable handle of the present invention could be used as a luggage handle, or any other type of handle, as would be apparent to one skilled in the relevant art.

Figure 5:
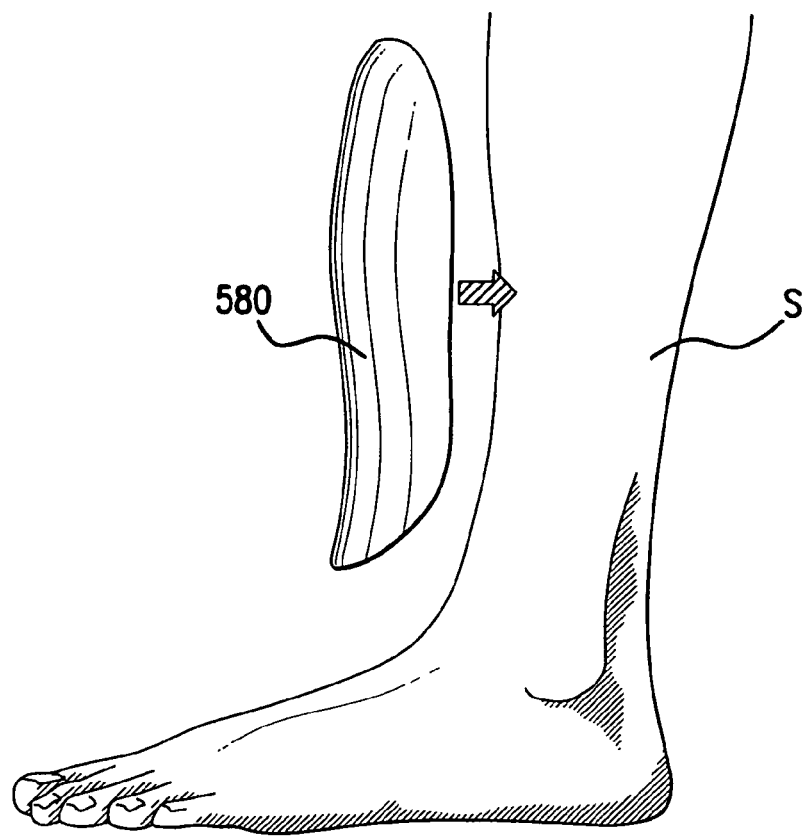
FIG. 5 is a side view of a moldable shin piece being conformed to a wearer's lower leg.

The heat-moldable thermoplastic layer according to the present invention may also be useful in a shin guard 580, as shown in FIG. 5. The thermoplastic layer may be in the form of a removable insert for a conventional shin guard that may be heated and softened in substantially the same manner as described above. The insert may then be pressed against a wearer's shin S and allowed to cool, resulting in a custom-fitted shin guard.

Figure 6:
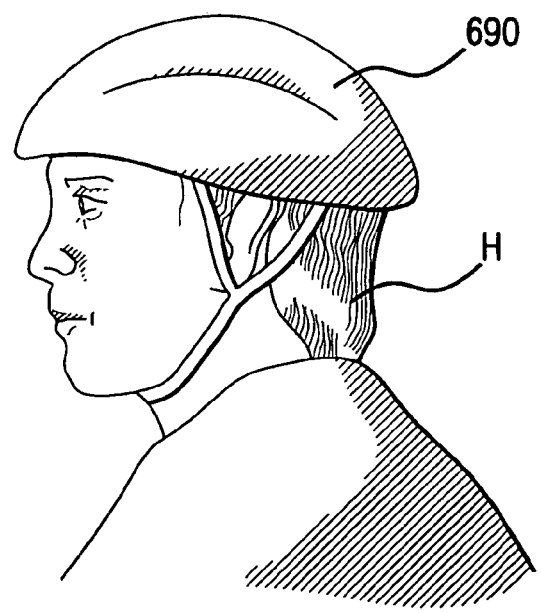
FIG. 6 is a side view of a moldable helmet being conformed to a wearer's head.

Other articles, such as a helmet 690, as shown in FIG. 6, may be custom-fitted to a wearer using the present invention. Helmet 690 may include a removable thermoplastic layer according to the present invention. The insert may be heat-softened and pressed against a wearer's head H. When the insert cools, the wearer is provided with a custom-fitted helmet 690.

A heat-moldable article of the present invention could also be used as a seat for a wheelchair, a child's car seat, or any other type of seat, as would be apparent to one skilled in the relevant art.

While the present invention has been particularly shown and described with reference to molding using body parts, which are preferred embodiments thereof, it will be understood by those skilled in the art that molding using other articles and other various changes in form and details may be made thereto, without departing from the spirit and scope of the invention.

What is claimed is:

1. A moldable article including a layer consisting essentially of foamed ethylene vinyl acetate copolymer and an antistatic agent, wherein said article is a helmet insert.

2. The article of claim 1, wherein said layer comprises between approximately ten percent and approximately thirty percent antistatic agent.

3. The article of claim 1, wherein said antistatic agent is selected from the group consisting of a polyol amine, an ethoxylated fatty alcohol, a phosphoric acid ester, a quaternary ammonium salt, and an amphoteric compound.

4. The article of claim 1, wherein said antistatic agent is a polyol amine.

5. The article of claim 4, wherein said polyol amine is an ethoxylated amine.

6. The article of claim 1, wherein said antistatic agent is an amine derivative having the formula R1N(R2)2, wherein R1 is a hydrophobic alkyl group and R2 is an alkyl group substituted by at least one hydrophobic moiety selected from OH, CO2H, CO2R3, wherein R3 is an alkyl.

7. The article of claim 6, wherein R2 is a hydroxyalkyl group.

8. The article of claim 7, wherein R2 is hydroxyethyl.

9. The article of claim 1, wherein said layer comprises approximately seventy percent ethylene vinyl acetate copolymer and approximately thirty percent antistatic agent.

10. The article of claim 1, wherein said wherein said article is custom-fitted to a wearer's head.

* * * * *